United States Patent
Pragada et al.

(10) Patent No.: US 7,768,961 B2
(45) Date of Patent: Aug. 3, 2010

(54) WIRELESS COMMUNICATION METHOD AND APPARATUS FOR RELIABLY TRANSMITTING DATA

(75) Inventors: Ravikumar V. Pragada, Collegeville, PA (US); William Francoeur, Royersford, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 665 days.

(21) Appl. No.: 11/154,842

(22) Filed: Jun. 16, 2005

(65) Prior Publication Data

US 2006/0251007 A1    Nov. 9, 2006

Related U.S. Application Data

(60) Provisional application No. 60/677,302, filed on May 3, 2005.

(51) Int. Cl.
*H04J 3/00* (2006.01)
*H04J 3/24* (2006.01)
*H04W 4/00* (2009.01)

(52) U.S. Cl. .................. 370/328; 370/464; 370/473

(58) Field of Classification Search ............... 370/328, 370/465, 474, 230, 235, 441, 394, 335, 432, 370/227–228, 428, 504, 345, 473, 464; 455/450, 455/452.2, 8, 67.11

See application file for complete search history.

(56) References Cited

U.S. PATENT DOCUMENTS

| | | | | |
|---|---|---|---|---|
| 5,966,384 A * | 10/1999 | Felix et al. | | 370/465 |
| 6,778,521 B1 * | 8/2004 | Korpela et al. | | 370/345 |
| 6,842,461 B2 * | 1/2005 | Harris | | 370/465 |
| 6,850,769 B2 * | 2/2005 | Grob et al. | | 455/515 |
| 7,403,528 B2 * | 7/2008 | Hu et al. | | 370/394 |
| 2003/0128705 A1 * | 7/2003 | Yi et al. | | 370/394 |
| 2003/0169708 A1 * | 9/2003 | Harris | | 370/335 |
| 2004/0196861 A1 * | 10/2004 | Rinchiuso et al. | | 370/441 |
| 2005/0122922 A1 * | 6/2005 | Wu et al. | | 370/310 |
| 2005/0201416 A1 * | 9/2005 | Chang et al. | | 370/469 |
| 2005/0216812 A1 * | 9/2005 | Leon et al. | | 714/748 |
| 2005/0220058 A1 * | 10/2005 | Garg | | 370/335 |
| 2005/0270996 A1 * | 12/2005 | Yi et al. | | 370/312 |
| 2006/0154603 A1 * | 7/2006 | Sachs et al. | | 455/39 |

* cited by examiner

*Primary Examiner*—George Eng
*Assistant Examiner*—Brandon J Miller
(74) *Attorney, Agent, or Firm*—Volpe and Koenig, P.C.

(57) ABSTRACT

A method and apparatus for reliably transmitting data by transmitting a plurality of radio link control (RLC) unacknowledged mode (UM) protocol data units (PDUs) over at least one primary channel and at least one auxiliary channel. If at least one RLC UM PDU is missing from the data transmitted over the primary channel, the missing RLC UM PDU is obtained from the auxiliary channel after a predetermined delay. A service data unit (SDU) is completed by combining PDUs received over the primary channel with at least one missing PDU received over the auxiliary channel. The SDU is sent to an application layer. If the missing PDU cannot be obtained before a predetermined time period expires, the transmitted data is deleted. The RLC UM PDUs may be used for streaming multicast applications.

11 Claims, 3 Drawing Sheets

WIRELESS COMMUNICATION METHOD AND APPARATUS FOR RELIABLY TRANSMITTING DATA

CROSS REFERENCE TO RELATED APPLICATION

This application claims the benefit of U.S. Provisional Application No. 60/677,302, filed May 3, 2005, which is incorporated by reference as if fully set forth herein.

FIELD OF INVENTION

The present invention is related to the wireless transmission of data, (i.e., user data), of steaming applications over primary and auxiliary channels. More particularly, the present invention is related to a radio link control (RLC) unacknowledged mode (UM), whereby data transmitted over the auxiliary channel is delayed with respect to data transmitted over the primary channel such that an RLC UM protocol data unit (PDU) that is not received, (i.e., it is missing), on the primary channel may be found on the auxiliary channel.

BACKGROUND

Existing RLC acknowledged mode (AM) is typically used for providing reliable transmission for non-real type of traffic. However, RLC AM is not suitable for real time and streaming type of applications. Streaming applications have stringent time constraints and jitter requirements. It would be desirable to make streaming applications more reliable.

SUMMARY

The present invention is related to a method and apparatus for reliably transmitting data by transmitting a plurality of RLC UM PDUs over at least one primary channel and at least one auxiliary channel. If at least one RLC UM PDU is missing from the data transmitted over the primary channel, the missing RLC UM PDU is obtained from the auxiliary channel after a predetermined delay. A service data unit (SDU) is completed by combining PDUs received over the primary channel with at least one missing PDU received over the auxiliary channel. The SDU is sent to an application layer. If the missing PDU cannot be obtained before a predetermined time period expires, the transmitted data is deleted. The RLC UM PDUs may be used for streaming multicast applications.

BRIEF DESCRIPTION OF THE DRAWINGS

A more detailed understanding of the invention may be had from the following description of a preferred embodiment, given by way of example and to be understood in conjunction with the accompanying drawing wherein.

DETAILED DESCRIPTION OF THE PREFERRED EMBODIMENTS

Hereafter, the terminology wireless transmit/receive unit (WTRU) includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

The present invention uses at least one auxiliary channel to provide reliable streaming applications by using RLC UM to transmit data of the streaming applications on both primary and auxiliary channels. The data transmitted on the auxiliary channel may optionally be delayed with respect to data transmitted on the primary channel. The extent of delay is dependent on the delay sensitivity of the streaming application, whereby the delay may be zero.

The number of auxiliary channels to be used is dependent on several factors such as the reliability required by the streaming application, bit error rate over air interface, or the like. The type of channel, (e.g., dedicated channel, forward access channel (FACH), or the like), to be used as auxiliary channels depends on whether RLC is used in unicast or multicast mode.

Figure 1:
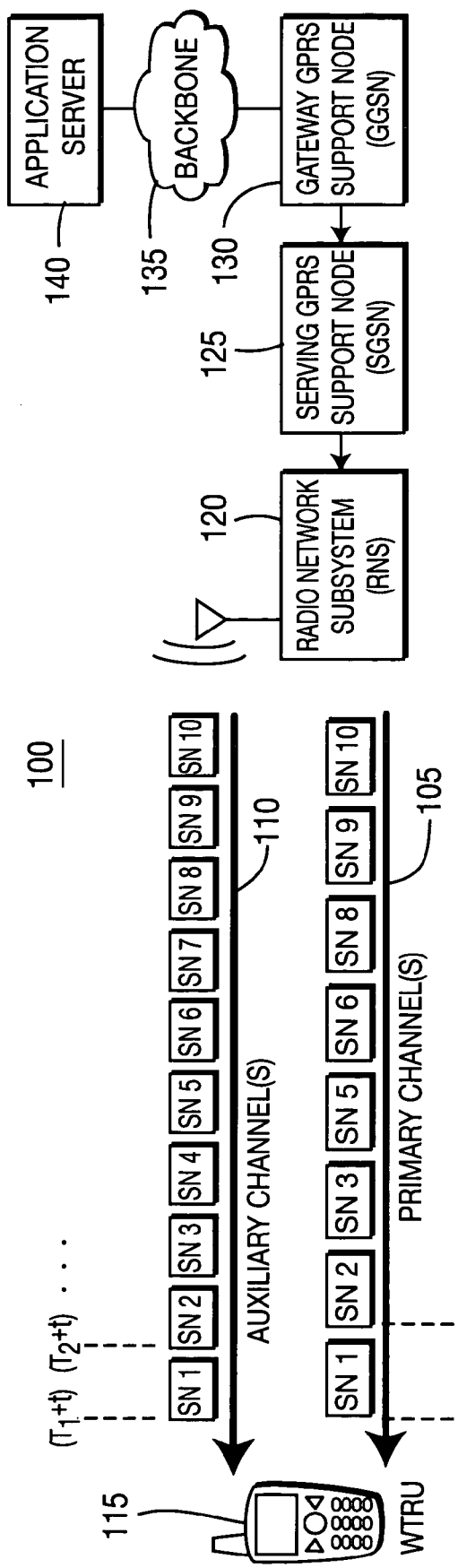
FIG. 1 shows a wireless communication system used to transmit data including PDUs over at least one primary channel and at least one auxiliary channel in accordance with the present invention.

FIG. 1 shows a wireless communication system 100 for transmitting data including PDUs over at least one primary channel 105 and at least one auxiliary channel 110 to a WTRU 115. The system further includes a radio network subsystem (RNS) 120, a serving general packet radio service (GPRS) support node (SGSN) 125, a gateway GPRS support node (GGSN) 130, a backbone network 135 and an application server 140. In the system 100, the RNS 120 transmits RLC UM PDUs with sequence numbers (SNs) 110 on the primary channel(s) 105 and the auxiliary channel(s) 110. A completed SDU is then sent to an application layer in accordance with the present invention.

Although the primary channel(s) 105 and the auxiliary channel(s) 110 are shown in FIG. 1 as being configured for a downlink to the WTRU 115, one skilled in the art would understand that the present invention disclosed herein is also applicable to an uplink from the WTRU 115, whereby the WTRU 115 transmits RLC UM PDUs with sequence numbers (SNs) 110 on the primary channel(s) 105 and the auxiliary channel(s) 110 to an RLC UM receiver located in the RNS 120 or another comparable device such as a Node-B.

If an RLC UM PDU is missing, (e.g., SN 4 and SN 7 are missing from the data transmitted on the primary channel 105, as shown in FIG. 1), an attempt is made to obtain this missing RLC UM PDU from the auxiliary channel(s) 110. The PDUs may be represented by an array of bits, whereby those bits with a value of 1 represent received PDUs and those bit with a value of 0 represent missing PDUs. The transmission of data over the auxiliary channel(s) 110 may optionally be delayed for a predetermined period of time, (e.g., by t seconds), after the same data is transmitted over the primary channel(s) 105.

For example, as shown in FIG. 1, every packet that is sent on the primary channel(s) 105 at a time $T_1$, $T_2$, and so on, is also transmitted on the auxiliary channel(s) 110 after a predetermined time delay of $T_1$+t, $T_2$+t, and so on. Thus, if on the primary channel(s) 105 a PDU with an SN 1 is sent at the time $T_1$, and a PDU with an SN 2 is sent at the time $T_2$, then these PDUs are sent on the auxiliary channel(s) 110 at times ($T_1$+t) and ($T_2$+t), respectively. The same procedure applies to all PDUs that are transmitted. Also, the number of auxiliary channels 110 to be used depends on the type of the application, and the extent of reliability desired. The "time-shift" or delay on each auxiliary channel 110 may also vary from one auxiliary channel 110 to another, whereby these different delays add more reliability to the transmission of the packets.

Figure 2:
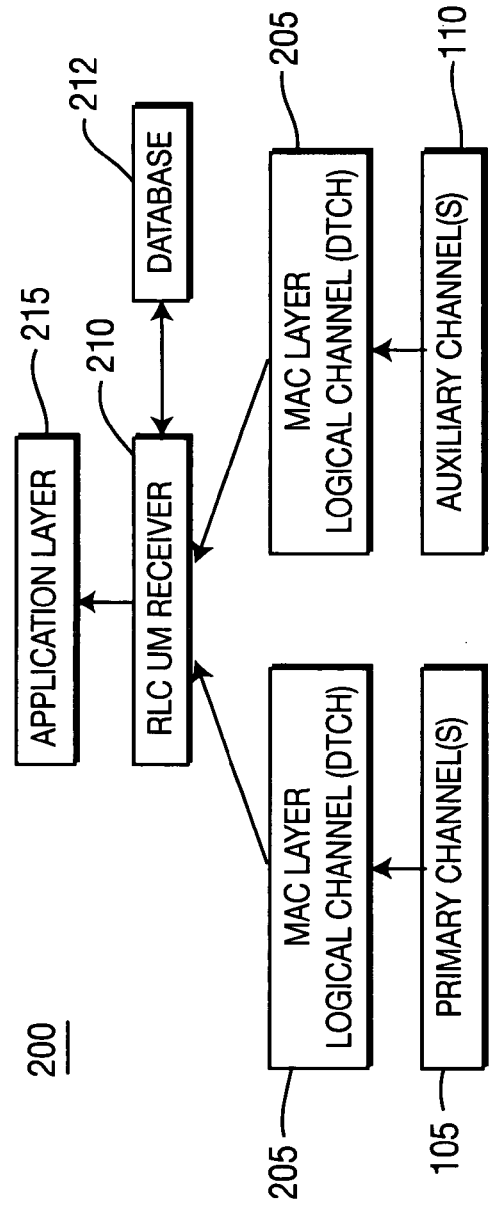
FIG. 2 shows an architecture for processing PDUs in accordance with the present invention.

FIG. 2 shows the architecture of a system 200 used for processing PDUs in accordance with the present invention. The system 200 may be incorporated in at least one of the WTRU 115, the RNS 120, base station or any other device that the WTRU 115 and RNS 120 communicate with. The system 200 includes medium access control (MAC) layers 205, (i.e., a logical channel such as a dedicated traffic channel (DTCH)), an RLC UM receiver 210, a database 212 and an application layer 215. Once an SDU is completed based on PDUs received by the RLC UM receiver 210, the SDU is delivered to higher layers, such as an application layer 215. If a PDU is not found on the primary channel(s) 105 or the auxiliary channel(s) 110, the PDU is treated as a missing PDU. The RLC UM receiver 210 will wait for the missing PDU based on how many auxiliary channel(s) 110 there are and the predetermined time periods (i.e., time delays) associated with the PDU transmission. If the missing PDU is still not found after the predetermined time period(s) elapse, the RLC UM receiver 210 ceases to wait for the missing PDU to be received.

The PDUs are received on the primary channel(s) 105 and the auxiliary channel(s) 110 via the MAC layers 205, and routed to the RLC UM receiver 210. The SNs of missing PDUs may be stored in the database 212 for future access by the RLC UM receiver 210, such that the RLC UM receiver 210 knows which PDUs, (i.e., missing PDUs), it should extract from the auxiliary channel(s) 110. The architecture of the system 200 shown in FIG. 2 may be incorporated into at least one of the WTRU 115 and the RNS 120 shown in FIG. 1.

The RLC UM receiver 210 waits for a predetermined time delay x to expire, (or an associated number of frames, depending on the implementation), for each missing PDU to be obtained from the auxiliary channel(s) 110. An SDU is then completed by the RLC UM receiver 210 and is forwarded from the RLC UM receiver 210 to the application layer 215.

The RLC UM receiver 210 completes an SDU by combining PDUs received on the primary channel(s) 105 with at least one missing PDU extracted from the auxiliary channel(s) 110 through the use of buffers and associated data structures. If a missing PDU cannot be retrieved from an auxiliary channel(s) 110, the corresponding SDU and any other associated PDUs are deleted, until the beginning of a next SDU is found, (e.g., as indicated by a length indicator). Similar processing is applied to the next SDU and other SDUs that follow.

Multimedia Broadcast/Multicast Service (MBMS) is introduced in order to support new services such as software upgrades, live telecast, news updates, virus alerts, or the like. Multicast delivery within any communication system is synonymous with point-to-multipoint transmission of data.

Figure 3:
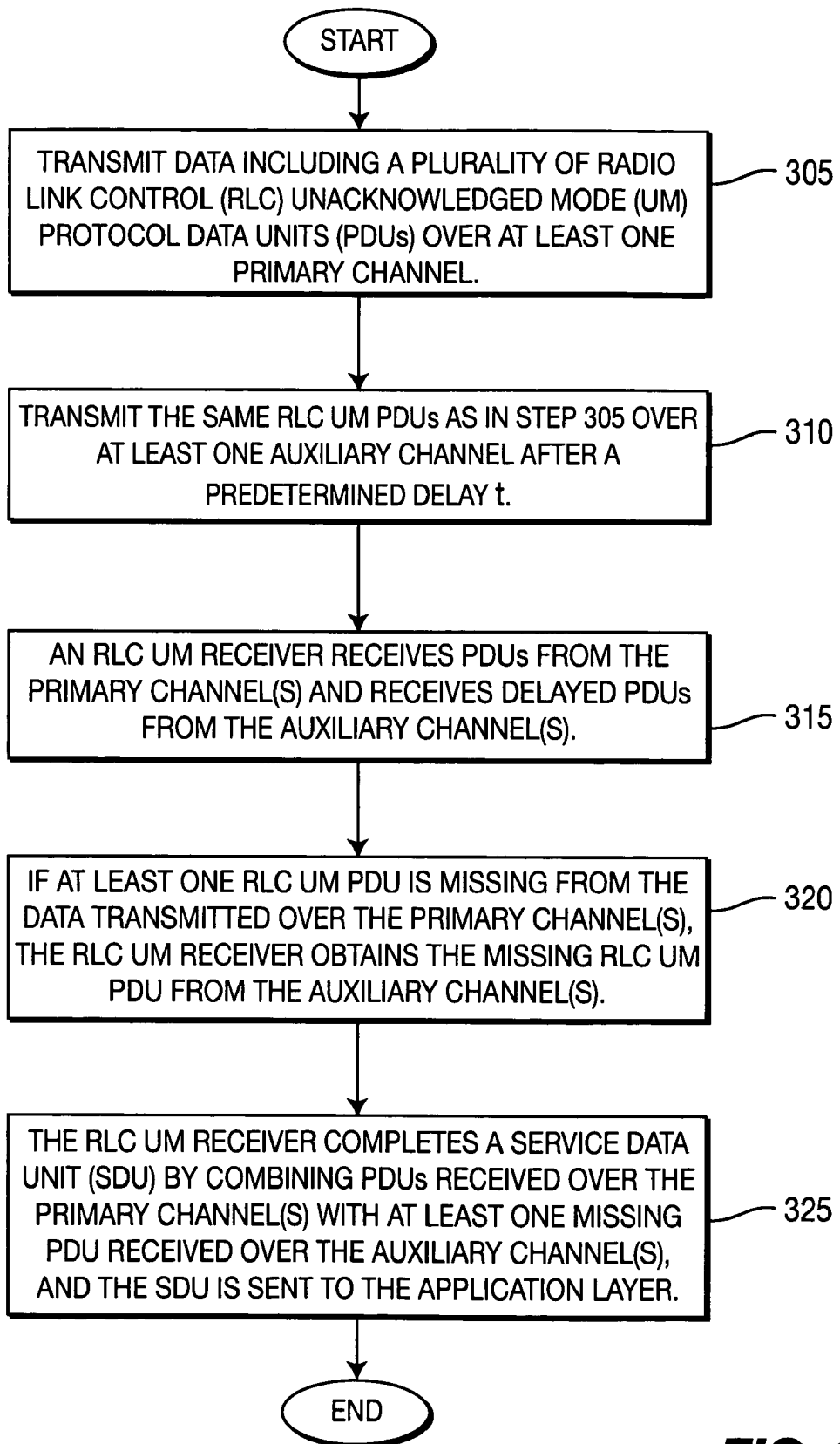
FIG. 3 is a flow diagram of a process including method steps for processing PDUs for a multicast session in accordance with the present invention.

FIG. 3 is a general flow diagram of a process 300 including method steps for processing PDUs in accordance with the present invention. In step 305, data including a plurality of RLC UM PDUs is transmitted over at least one primary channel 105. In step 310, the same RLC UM PDUs as in step 305 are transmitted over at least one auxiliary channel 110 after a predetermined delay t. In step 315, the RLC UM receiver 210 receives PDUs from the primary channel(s) 105 and receives delayed PDUs from the auxiliary channel 110. If a least one RLC UM PDU is missing from the data transmitted over the primary channel(s) 105, the RLC UM receiver 210 obtains the missing RLC UM PDU(s) from the auxiliary channel(s) 110 (step 320). In step 325, the RLC UM receiver 210 completes an SDU by combining PDUs received over the primary channel(s) 105 with at least one missing PDU received over the auxiliary channel(s) 110, and the completed SDU is sent to the application layer 215.

Figure 4:
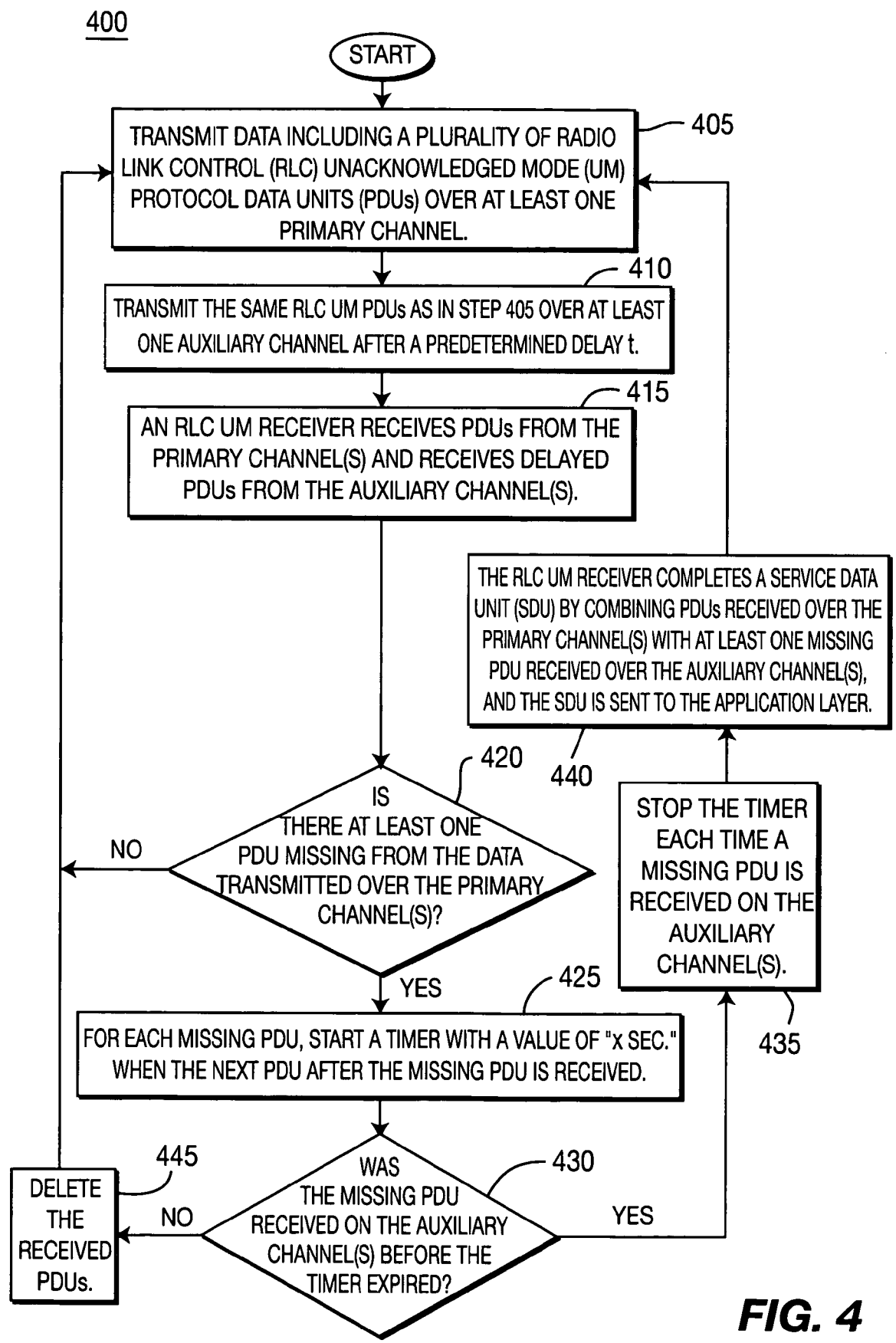
FIG. 4 is a flow diagram of a process similar to the process of FIG. 3, whereby a timer is used to determine whether an SDU should be completed or the received PDUs should be deleted in accordance with the present invention.

FIG. 4 is a flow diagram of a process 400 similar to the process 300, whereby a timer is used to determine whether an SDU should be completed or the received PDUs should be deleted. In step 405, data including a plurality of RLC UM PDUs is transmitted over at least one primary channel 105. In step 410, the same RLC UM PDUs as in step 405 are transmitted over at least one auxiliary channel 110 after a predetermined delay t. In step 315, an RLC UM receiver 210 receives PDUs from the primary channel(s) 105 and receives delayed PDUs from the auxiliary channel(s) 110. If, in step 420, it is determined that there is at least one RLC UM PDU missing from the data transmitted over the primary channel(s) 105, a timer with a value of "x sec." is started when the next PDU after the missing PDU is received (step 425). If the at least one missing PDU is received on the auxiliary channel(s) 110 before the timer expires (step 430), the timer is stopped (step 435), the RLC UM receiver 210 completes an SDU by combining PDUs received over the primary channel(s) 105 with at least one missing PDU received over the auxiliary channel(s) 110, and the completed SDU is sent to the application layer 215 (step 440). If the at least one missing PDU is not received on the auxiliary channel(s) 110 before the timer expires, the PDUs received in step 405 are deleted (step 445).

Each RLC entity is mapped to a specific logical channel, which in-turn is mapped to a transport channel. The present invention may be applicable to all types of logical and transport channels, and mappings of logical and transport channels that can be associated with an RLC entity used to obtain missing PDUs from at least one auxiliary channel.

In an alternative embodiment, FIG. 2 shows the architecture of a system 200 used for processing PDUs in accordance with the present invention. The system 200 includes medium access control (MAC) layers 205, (i.e., a logical channel such as a dedicated traffic channel (DTCH)), an RLC UM receiver 210, a database 212 and an application layer 215. Once an SDU is completed based on PDUs received by the RLC UM receiver 210, the SDU is delivered to higher layers, such as an application layer 215. If a PDU is not found on the primary channel(s) 105 or the auxiliary channel(s) 110, the PDU is treated as a missing PDU. The RLC UM receiver 210 will wait for the missing PDU based on how many auxiliary channel(s) 110 there are and the predetermined time periods (i.e., time delays) associated with the PDU transmission. If the missing PDU is still not found after the predetermined time period(s) elapse, the RLC UM receiver 210 ceases to wait for the missing PDU to be received.

The PDUs are received on the primary channel(s) 105 and the auxiliary channel(s) 110 via the MAC layers 205, and routed to the RLC UM receiver 210. The SNs of missing PDUs may be stored in the database 212 for future access by the RLC UM receiver 210, such that the RLC UM receiver 210 knows which PDUs, (i.e., missing PDUs), it should extract from the auxiliary channel(s) 110. The architecture of the system 200 shown in FIG. 2 may be incorporated into at least one of the WTRU 115 and the RNS 120 shown in FIG. 1.

The RLC UM receiver 210 waits for a predetermined time delay x to expire, (or an associated number of frames, depending on the implementation), for each missing PDU to be obtained from the auxiliary channel(s) 110. An SDU is then completed by the RLC UM receiver 210 and is forwarded from the RLC UM receiver 210 to the application layer 215.

The RLC UM receiver 210 completes an SDU by combining PDUs received on the primary channel(s) 105 with at least one missing PDU extracted from the auxiliary channel(s) 110 through the use of buffers and associated data structures. If a missing PDU cannot be retrieved from an auxiliary channel(s) 110, the corresponding SDU and any other associated PDUs are deleted, until the beginning of a next SDU is found, (e.g., as indicated by a length indicator). Similar processing is applied to the next SDU and other SDUs that follow.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for reliable transmission of data, the method comprising:
   receiving a plurality of radio link control (RLC) unacknowledged mode (UM) protocol data units (PDUs) over at least one primary channel;
   receiving a plurality of RLC UM PDUs over at least one auxiliary channel, wherein the plurality of RLC UM PDUs received over the at least one auxiliary channel are identical to the plurality of RLC UM PDUs received over the at least one primary channel;
   on a condition that at least one RLC UM PDU is missing from the PDUs received over the primary channel, obtaining the missing RLC UM PDU from the auxiliary channel and completing a service data unit (SDU) by combining the PDUs received over the primary channel with the missing PDU obtained from the auxiliary channel;
   starting a timer on a condition that a next PDU, after the missing PDU, is received over the primary channel;
   stopping the timer on a condition that the missing PDU is received on the auxiliary channel; and
   deleting the PDUs received over the primary channel on a condition that the missing RLC UM PDU cannot be obtained from the auxiliary channel before the timer expires.

2. The method of claim 1 wherein each of the PDUs received over the auxiliary channel is received after a predetermined delay period with respect to each PDU received over the primary channel.

3. The method of claim 1 wherein the RLC UM PDUs are used for streaming multicast applications.

4. The method of claim 1 further comprising:
   setting a value of the timer which establishes a time period between on a condition that the timer starts and on a condition that the timer expires.

5. The method of claim 1 further comprising:
   setting a value of the timer which establishes a number of frames that define a time period between on a condition that the timer starts and on a condition that the timer expires.

6. A wireless transmit/receive unit (WTRU) comprising:
   a receiver configured for receiving:
      a plurality of radio link control (RLC) unacknowledged mode (UM) protocol data units (PDUs) over at least one primary channel; and
      a plurality of RLC UM PDUs over at least one auxiliary channel, wherein the plurality of RLC UM PDUs received over the at least one auxiliary channel are identical to the plurality of RLC UM PDUs received over the at least one primary channel;
   on a condition that at least one RLC UM PDU is missing from the PDUs received over the primary channel, the receiver further configured for obtaining the missing RLC UM PDU from the auxiliary channel and completing a service data unit (SDU) by combining the PDUs received over the primary channel with the missing PDU obtained from the auxiliary channel;
   a receiver component configured for:
      starting a timer on a condition that a next PDU, after the missing PDU, is received over the primary channel; and
      stopping the timer on a condition that the missing PDU is received on the auxiliary channel; and
   the receiver further configured for deleting the PDUs received over the primary channel on a condition that the missing RLC UM PDU cannot be obtained from the auxiliary channel before the timer expires.

7. The WTRU of claim 6 wherein each of the PDUs received over the auxiliary channel is received after a predetermined delay period with respect to each PDU received over the primary channel.

8. The WTRU of claim 6 wherein the RLC UM PDUs are used for streaming multicast applications.

9. The WTRU of claim 6 wherein the receiver further is configured for deleting the PDUs received over the primary channel on a condition that the missing RLC UM PDU is not received and cannot be obtained from the auxiliary channel.

10. The WRTU of claim 6 wherein the receiver component is further configured for setting a value of the timer which establishes a time period between on a condition that the timer starts and on a condition that the timer expires.

11. The WTRU of claim 6 wherein the receiver component is further configured for setting a value of the timer which establishes a number of frames that define a time period between on a condition that the timer starts and on a condition that the timer expires.

* * * * *